(12) United States Patent
Garcia-Herreros et al.

(10) Patent No.: US 12,031,813 B2
(45) Date of Patent: Jul. 9, 2024

(54) SUPPORT ELEMENT FOR A PRECISION DEVICE, SUPPORT FRAME FOR A PRECISION DEVICE AND PRECISION DEVICE HAVING SUCH A SUPPORT ELEMENT OR SUPPORT FRAME

(71) Applicant: ETEL S.A., Motiers (CH)

(72) Inventors: Ivan Garcia-Herreros, St. Sulpice (CH); Philipp Kobel, Nidau (CH)

(73) Assignee: ETEL S.A., Motiers (CH)

( * ) Notice: Subject to any disclaimer, the term of this patent is extended or adjusted under 35 U.S.C. 154(b) by 383 days.

(21) Appl. No.: 17/608,988

(22) PCT Filed: May 13, 2020

(86) PCT No.: PCT/EP2020/063281
§ 371 (c)(1),
(2) Date: Nov. 5, 2021

(87) PCT Pub. No.: WO2020/239442
PCT Pub. Date: Dec. 3, 2020

(65) Prior Publication Data
US 2022/0214152 A1    Jul. 7, 2022

(30) Foreign Application Priority Data
May 28, 2019 (EP) .................................. 19176967

(51) Int. Cl.
*G01B 5/00* (2006.01)
*G01M 11/04* (2006.01)

(52) U.S. Cl.
CPC ......... *G01B 5/0004* (2013.01); *G01B 5/0014* (2013.01); *G01M 11/04* (2013.01)

(58) Field of Classification Search
CPC ..... G01B 5/0004; G01B 5/0014; G01M 11/04
See application file for complete search history.

(56) References Cited

U.S. PATENT DOCUMENTS 4,188,699 A * 2/1980 Young ...................... F16J 15/32
264/249
4,406,158 A * 9/1983 Allington ............... G01N 30/30
73/61.57

(Continued)

FOREIGN PATENT DOCUMENTS

| DE | 3843286 C1 | 6/1990 |
|---|---|---|
| DE | 102008036573 B3 | 4/2010 |
| DE | 102013007654 A1 | 10/2014 |

OTHER PUBLICATIONS

English translation of DE102013007654 accessed from espacenet.com Jan. 10, 2023.*

*Primary Examiner* — Kristina M Deherrera
*Assistant Examiner* — Jean F Morello
(74) *Attorney, Agent, or Firm* — LEYDIG, VOIT & MAYER, LTD.

(57) ABSTRACT

A support member for a precision device includes a vertical support element and a horizontal support element. The vertical support element extends along a vertical main direction of extent and includes a material with a low thermal expansion coefficient. The horizontal support element horizontally surrounds at least a portion of the vertical support element and is configured to horizontally support the vertical support element against tilting from the main direction of extent. The horizontal support element bounds a thermally insulating interior space in which the vertical support element is partially accommodated.

14 Claims, 5 Drawing Sheets

(56) References Cited

U.S. PATENT DOCUMENTS

| | | | | |
|---|---|---|---|---|
| 4,744,675 A | * | 5/1988 | Sakino | B23Q 1/58 |
| | | | | 384/12 |
| 5,781,355 A | * | 7/1998 | Meier | G01M 11/04 |
| | | | | 359/848 |
| 7,841,097 B2 | * | 11/2010 | Evans | G01D 5/34746 |
| | | | | 33/502 |
| 2009/0067944 A1 | * | 3/2009 | Motta | B23Q 1/012 |
| | | | | 408/152 |
| 2014/0027557 A1 | * | 1/2014 | Yamawaki | B60R 16/027 |
| | | | | 242/400 |

\* cited by examiner (A-A)

SUPPORT ELEMENT FOR A PRECISION DEVICE, SUPPORT FRAME FOR A PRECISION DEVICE AND PRECISION DEVICE HAVING SUCH A SUPPORT ELEMENT OR SUPPORT FRAME

CROSS REFERENCE TO RELATED APPLICATIONS

This application is a U.S. National Phase application under 35 U.S.C. § 371 of International Application No. PCT/EP2020/063281, filed on May 13, 2020, and claims benefit to European Patent Application No. EP 19176967.8, filed on May 28, 2019. The International Application was published in German on Dec. 3, 2020 as WO 2020/239442 A1 under PCT Article 21(2).

FIELD

The present invention relates to embodiments of a support member for a precision device, embodiments of a support frame for a precision device, as well as embodiments of a precision device having such a support member or such a support frame.

BACKGROUND

Such a support member or support frame may be used, for example, for a precision device, such as an optical table, a metrology frame, or a precision work table (e.g., with a precision positioning device disposed thereon).

When designing such high-precision and at the same time highly stable structures, the engineer must pursue two apparently contradictory objects. On the one hand, he or she must create a rigid but lightweight structure (especially to prevent degradation of the structure or to prevent short-term operations on a workpiece or on a sample from being delayed as a result of vibrations of the structure), and on the other hand he or she must ensure long-term thermal stability of the device in order, for example, to enable a reliable and reproducible measuring or machining process. As mentioned, the first object generally requires a lightweight, rigid structure to minimize oscillations. In contrast, the second object generally requires a massive structure (for high thermal inertia) with a geometry that involves a minimum possible heat transfer surface area so as to ensure stability with respect to thermal requirements.

The negative effect of thermal expansion on precision systems has as such been known for a long time. This has led, for example, to the invention of clocks with a gridiron pendulum and to the development of materials with a low thermal expansion coefficient (hereinafter also referred to in short as TEC), such as the so-called Invar alloys.

In precision positioning applications, the thermal expansion of the structures used involves, for example, significant limitations with respect to the achievable precision.

One known approach is generally to use materials with a low TEC to ensure geometric stability and to achieve a compromise between the two aforementioned objects by combining different materials and geometric properties.

However, this approach generally has the drawback that such a structure is relatively complex and costly to manufacture. In addition, such structures are ultimately still subject to certain thermal variations caused by environmental influences.

DE 8 43 286 C1 proposes a profile measuring device where supports of a measurement probe are manufactured from so-called Invar steel.

SUMMARY

In an embodiment, the present disclosure provides a support member for a precision device. The support member includes a vertical support element and a horizontal support element. The vertical support element extends along a vertical main direction of extent and includes a material with a low thermal expansion coefficient. The horizontal support element horizontally surrounds at least a portion of the vertical support element and is configured to horizontally support the vertical support element against tilting from the main direction of extent. The horizontal support element bounds a thermally insulating interior space in which the vertical support element is partially accommodated.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
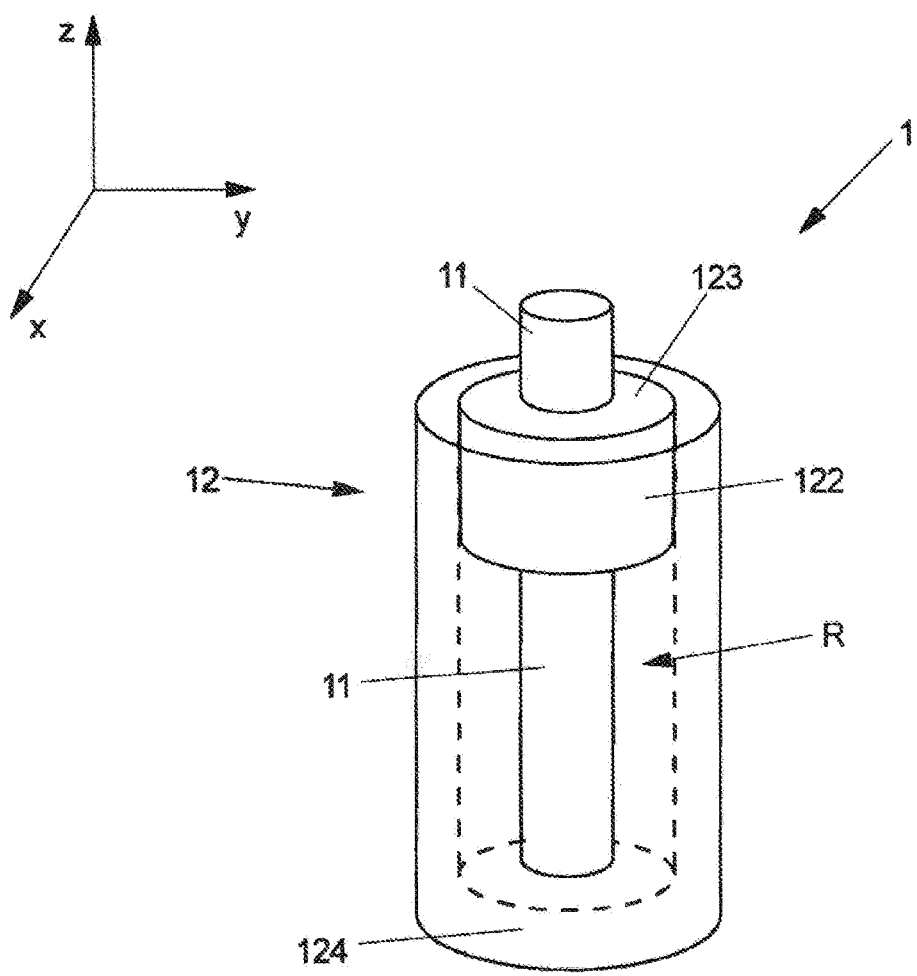
FIG. 1A is an exemplary schematic perspective view of a support member according to one or more embodiments.

In an embodiment, the present invention provides a support member for a precision device which support member has good properties with respect to mechanical rigidity and thermal stability requirements and at the same time allows for easy manufacture, assembly, and scalability.

In another embodiment, the present invention provides a corresponding support frame for a precision device as well as a precision device having such a support member or such a support frame.

In accordance with a first aspect, there is provided a support member for a precision device, the support member including a vertical support element extending along a vertical main direction of extent. The vertical support element includes a material with a low thermal expansion coefficient (and may in particular be composed of such a material). The support member further includes a horizontal support element which horizontally surrounds at least a portion of the vertical support element and which is configured to horizontally support the vertical support element against tilting from the main direction of extent (i.e., to prevent tilting from the main direction of extent). In the context of the present description, the term "tilting" is understood to refer to a translational displacement of at least a portion of the vertical support element in the horizontal direction and/or a rotation of at least a portion of the vertical support element about a horizontal direction. Thus, the horizontal support element is configured to counteract both horizontally directed forces and torques. The horizontal support element defines a thermally insulating interior space in which the vertical support element is partially accommodated. In other words, the interior space of the horizontal support element provides thermal insulation for at least a portion of the vertical support element.

In accordance with a second aspect, a support frame for a precision device includes a plurality of interconnected support members according to the first aspect, the vertical support elements of the plurality of support members having different main directions of extent.

A third aspect provides that a precision device in the form of an optical table, a metrology frame and/or a precision work stage include at least one support member according to the first aspect or a support frame according to the second aspect.

In the following, reference is made to all of the aforementioned aspects.

The vertical support element may take the form of a (e.g., circular-cylindrical) rod. It performs the function of ensuring thermal stability of the support member against thermal variations, in particular with respect to the main direction of extent. Thus, via the vertical support element, the support member may support, for example, a portion of a precision device or another such support member with respect to the vertical main direction of extent without appreciable displacement or strain occurring in response to temperature changes.

In this context, it should be understood that the main direction of extent referred to as "vertical" herein is intended to define a (locally) "vertical" direction merely with respect to the support member, which (locally) "vertical" direction is perpendicular to a plane that is (locally) "horizontal" in this sense, but it does not necessarily mean that the vertical support element has to extend in a vertical direction in a more global sense (such as, for example, a vertical with respect to the higher-level precision device or a vertical defined by a direction of action of gravity).

In accordance with an embodiment, the vertical support element includes or is composed of an Invar alloy. Invar alloys are special iron-nickel alloys (possibly containing magnesium, silicon, carbon and/or cobalt as additional alloy components) such as, for example, FE65NI35 Invar, which has an extremely low TEC. Alternatively or in addition to Invar, the vertical support element may also include other materials with a low TEC, such as Kovar, Zerodur, or other industrial ceramics.

In accordance with an embodiment, a linear TEC of the vertical support element is at least a factor of two smaller than a linear TEC of the horizontal support element. For example, at an ambient temperature of 20° C., the linear TEC of the vertical support element may be smaller than or equal to $2.0 \cdot 10^{-6}\ K^{-1}$.

The horizontal support element provides sufficient rigidity for the support member and thus for a precision device that includes the support member. In particular, the horizontal support element increases the rigidity against forces acting in a horizontal plane that is perpendicular to the vertical main direction of extent.

This is accomplished, in particular, in that the horizontal support element, which horizontally surrounds at least a portion of the vertical support element, prevents the vertical support element from being displaced from the main direction of extent. For this purpose, the horizontal support element may, for example, be configured and disposed to surround that portion of the vertical support element around the entire circumference thereof (about the main direction of extent).

In accordance with an exemplary embodiment, the horizontal support element includes at least one of the materials steel and aluminum. In particular, the horizontal support element may be composed of one or more of the aforementioned materials. The use of the materials mentioned can provide the required rigidity against horizontally acting forces.

For example, one or more standard extruded profiles made of the aforementioned materials may be used. The horizontal support element may be configured such that a wall thickness of the horizontal support element tapers upwardly; i.e., such that the horizontal support element has a relatively thin wall thickness in an upper region (relative to the vertical main direction of extent).

Preferably, the horizontal support element is further configured and disposed such that it will provide rigidity in the horizontal plane as described, but at the same time such that it will at most only slightly hinder vertical movement of a portion of the vertical support element relative to the horizontal support element (e.g., as a result of thermal expansion or contraction of the horizontal support element and/or of the vertical support element).

Therefore, in an embodiment, the horizontal support element is configured and disposed such that it will offer at most only little frictional resistance to linear expansion or contraction of the horizontal support element and/or of the vertical support element along the main direction of extent. This makes it possible to prevent deterioration of the performance of the precision device from occurring as a result of friction effects.

In an embodiment, the horizontal support element includes a bearing portion for horizontally supporting the vertical element. The bearing portion has, for example, a through-hole through which the vertical support element extends.

In a variant, it may also be provided that the bearing portion form an air bearing, in particular a porous air bearing, for the vertical support element. However, a low-friction plain bearing (e.g., a self-lubricating plain bearing), a ball bearing, an electromagnetic bearing, or a leaf spring bearing, for example, may be provided as an alternative to an air bearing.

Using such a bearing, it would be possible to decouple linear expansion or contraction of the vertical support element on the one hand and of the horizontal support element on the other hand. Therefore, the vertical support element is subject only to small vertical forces.

In another variant, a leaf spring (e.g., an annular leaf spring) is disposed between the vertical support element and the horizontal support element, the leaf spring preferably being configured to be relatively rigid in the horizontal direction (i.e., in the radial direction relative to the main direction of extent) and relatively flexible in the vertical direction (i.e., in the main direction of extent).

The above-described variants of the bearing portion thus make it possible to effectively support the vertical support element against tilting from the vertical, but without offering any hindering frictional resistance to linear expansion movement of the vertical support element along the vertical.

In a variant, the bearing portion may provide a fluid-tight (in particular air-tight) bearing for the vertical support element. This may be accomplished, for example, by means of an annular leaf spring disposed on (or itself forming) the bearing portion. As will be explained in more detail below, by providing such a fluid-tight bearing, an interior space providing very good thermal insulation may be created in which a portion of the vertical support element is accommodated.

In accordance with a preferred embodiment, the horizontal support element is axially symmetrical with respect to the main direction of extent. In particular, the horizontal support element may be rotationally symmetrical with respect to the main direction of extent. For example, the horizontal support element may have a cylindrical shape, such as a circularly cylindrical shape.

In an embodiment, the horizontal support element has in this case a shell portion (corresponding to a cylinder shell) as well as a top cover portion (corresponding to the top cover of a cylinder), the top cover portion including or forming a bearing portion of the type described above. Thus, in that exemplary embodiment, the support member overall has a structure which reminds one of a cylinder piston.

In addition to providing horizontal rigidity, the horizontal support element performs another function which consists in shielding the vertical support element from thermal variations (i.e., fluctuations of an ambient temperature). This is made possible by the horizontal support element surrounding at least a portion of the vertical support element and defining a thermally insulating interior space in which the vertical support element is partially accommodated.

Of course, the thermal insulation does not have to be perfect. Generally, it is sufficient to a measurable shielding of the portion of the vertical support element that is accommodated in the interior space from fluctuations of the ambient temperature. In this way, it is possible to further reduce thermal expansion or contraction of the vertical support element, especially along the main direction of extent (which may already be low due to the low TEC of the vertical support element).

For example, the interior space may be lined with an insulating material to enhance the insulation effect. Alternatively or additionally, vacuum insulation or insulation by an air gap (which means that the interior space is filled with air) may be provided.

In accordance with a preferred embodiment, the interior space may be sealed fluid-tight, such as, for example, air-tight. By accommodating a portion of the vertical support element in a fluid-tight interior space, this portion of the vertical support element can be shielded particularly well from temperature influences in the ambient environment (i.e., in the exterior space). For example, a vacuum may be present in the fluid-tight interior space, whereby that portion of the vertical support element is thermally insulated like in a thermos bottle.

In order to create a fluid-tight interior space, it is, for example, possible, as mentioned earlier, to provide the horizontal support element with a bearing portion that includes or forms a fluid-tight bearing for the vertical support element. Such a bearing may be provided, for example, in the form of an annular leaf spring.

In a variant, the support member, and specifically its horizontal support element, which forms an interior space, has a connection for a temperature control system for controlling a temperature in the interior space. This enables, for example, temperature-controlled ventilation of the interior space, which allows the interior space to be maintained at a substantially constant temperature at all times. This also contributes to further reducing linear expansion or contraction of the vertical support element.

In accordance with the foregoing, the proposed solution provides inter alia the advantages that it makes it possible to ensure geometric stability of a support structure against fluctuations of the ambient temperature and, at the same time, to ensure stability against vertically acting forces (the vertical support element itself has inherent tensile and compressive stiffness) as well as against horizontally acting forces (by means of the horizontal support element).

In addition, the invention allows for easy assembly of high-precision, highly stable devices (e.g., optical tables or metrology frames as well as support frames for such applications) in a modular manner; i.e., using a plurality of standardized support members which can be interconnected in a flexible manner that is tailored to the respective application. This makes it possible to reduce the design cycle times of such precision devices and to achieve cost savings.

Other embodiments and advantages of the invention will become apparent from the following description of several exemplary embodiments, taken in conjunction with the figures.

FIG. 1A exemplarily and schematically shows in perspective view a support member 1 according to an exemplary embodiment. Support member 1 includes a vertical support element 11 extending along a vertical main direction of extent Z.

In the present case, vertical support element 11 is implemented in the form of a circular-cylindrical rod. Vertical support element 11 is composed of a material with a low thermal expansion coefficient (TEC), such as a so-called Invar alloy. Thus, for example, it may be provided that vertical support element 11 have a TEC smaller than or equal to $2.0 \cdot 10^{-6}\ K^{-1}$ at an ambient temperature of 20° C. In the support structure 1 shown, vertical support element 11 performs a supporting function with respect to both compression and tensile forces in main direction of extent Z.

However, in order to achieve overall good rigidity of support member 1, support member 1 further includes a horizontal support element 12. In accordance with the illustrated exemplary embodiment, horizontal support element 12 has a hollow-cylindrical basic shape having a circular bottom portion 124, a shell portion 122, and a bearing portion 123. Shell portion 122 is drawn transparently to better illustrate the other elements of the support member. However, in real embodiments, the shell portion 122 of the horizontal support element does of course not have to be transparent.

Bearing portion 123 is inserted in the manner of a plug in an upper region into a hollow space laterally enclosed by shell portion 122, thereby upwardly sealing an interior space R formed in horizontal support element 12. Vertical support element 11 extends into interior space R through a through-hole of bearing portion 123. Vertical support element 11 is supported downwardly on bottom portion 124 of horizontal support element 12.

Accordingly, in the exemplary embodiment shown, horizontal support element 12 is axially symmetrical and, more specifically rotationally symmetrical with respect to main direction of extent Z. In other exemplary embodiments, the horizontal support element may be quadrangular, e.g., rectangular or square, in a horizontal cross section. The horizontal support element may, for example, be at least partially manufactured as an extruded profile.

Horizontal support element 12 includes, for example, steel and/or aluminum and may in particular be manufactured from one or more of the aforementioned materials.

Using the materials mentioned for horizontal support element 12 can provide the required rigidity against horizontally acting forces or strain.

Via bearing portion 123, horizontal support element 12 can support vertical support element 11 against tilting from main direction of extent Z in a horizontal direction (for example, under mechanical loading of support member 1).

In a variant, it may also be provided that bearing portion 123 form an air bearing, in particular a porous air bearing for vertical support element 11. However, a low-friction plain bearing may also be provided as an alternative to an air bearing.

In a variant, a leaf spring may be disposed between vertical support element 11 and bearing portion 123, the leaf spring being configured to be relatively rigid in horizontal direction X-Y (i.e., in the radial direction relative to main direction of extent Z) and relatively flexible in the vertical direction (i.e., in main direction of extent Z). It is also possible to provide a bearing which is composed of two parallel leaf springs and capable of accommodating torques (with respect to rotations about the two horizontal directions X and Y).

The above-mentioned variants thus make it possible to effectively support vertical support element 11 against tilting from the vertical Z, but without offering any hindering frictional resistance to linear expansion movement of vertical support element 11 along the vertical Z.

In the exemplary embodiment shown, in addition to providing horizontal rigidity, horizontal support element 12 performs the function of shielding the portion of vertical support element 11 that is accommodated in interior space R from fluctuations of an ambient temperature. The shielding effect may be enhanced, for example, by lining interior space R with a thermally insulating material.

Interior space R may be sealed substantially air-tight, for example by bottom portion 124, shell portion 122, and bearing portion 123 as a top cover portion. By accommodating a portion of vertical support element 11 in that (at least substantially) air-tight inner space R, it is thus possible to shield vertical support element 11 from temperature fluctuations in the ambient environment of (i.e., in the space exterior to) supporting member 1. In this way, it is possible to further reduce thermal expansion or contraction of vertical support element 11, particularly along main direction of extent Z. An air or fluid-tight interior space R also offers other options, such as vacuum insulation or active temperature control, for example using a coolant.

Figure 1B:
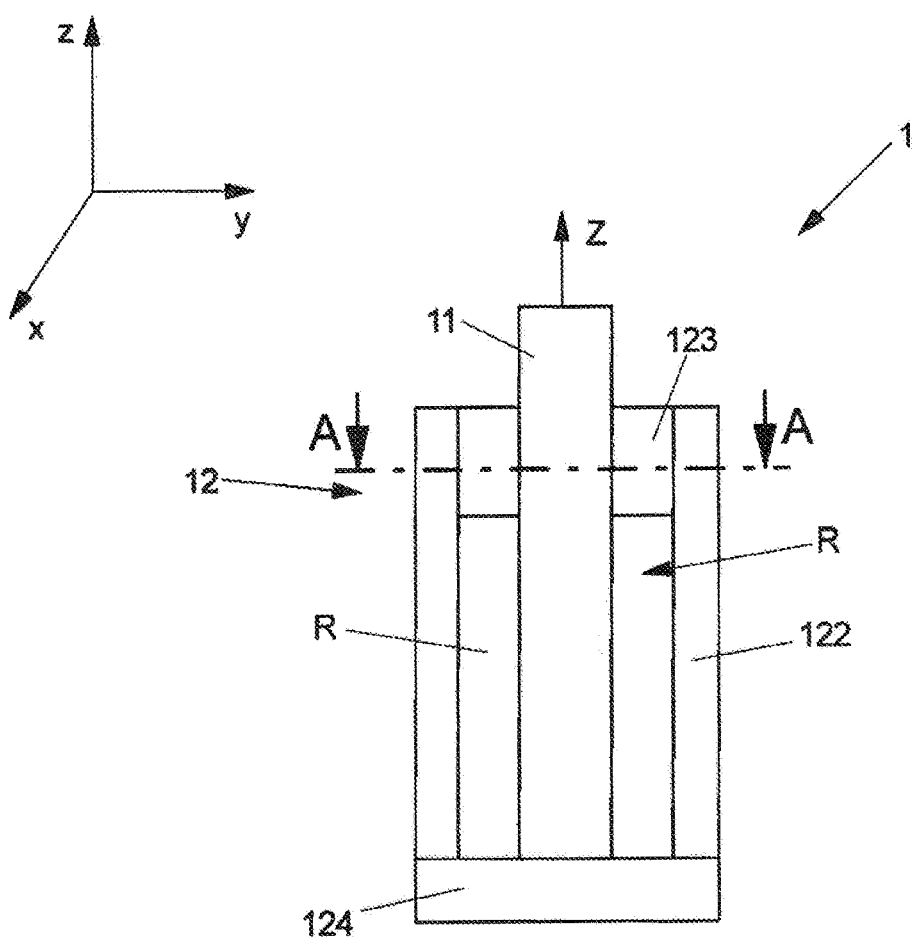
FIG. 1B is an exemplary schematic cross-sectional view of the support member of FIG. 1A.

FIG. 1B shows a cross section through the support member at 1 of FIG. 1A, taken along main direction of extent Z. As can be readily seen, the vertical support element 11 in the form of Invar rod 11 extends through bearing portion 123 and rests thereagainst in the horizontal direction. In a departure from the illustration in FIG. 1B, vertical support element 11 does not necessarily have to traverse bearing portion 123; for example, it may merely project into bearing portion 123.

Figure 1C:
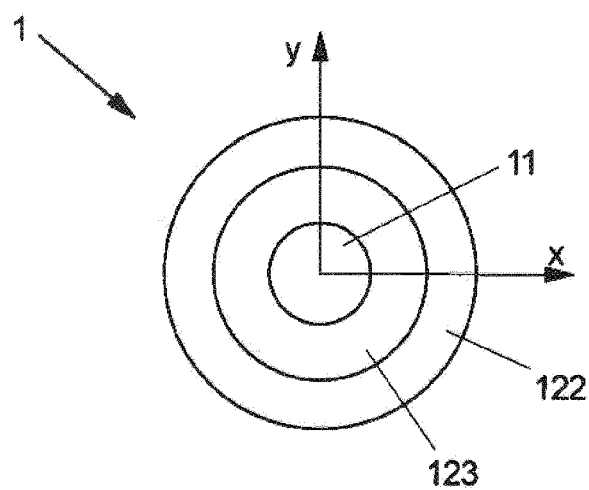
FIG. 1C is another exemplary schematic cross-sectional view of the support member of FIGS. 1A and 1B.

FIG. 1C shows another schematic cross-sectional view of the support member 1 according to FIGS. 1A and 1B; the cross-sectional plane being the X-Y plane. The cross section shown is taken at the level of engagement portion 123 with respect to vertical main direction of extent Z. The label A-A in FIG. 1B refers to the cross section shown in FIG. 1C. FIG. 1C illustrates the rotationally symmetrical structure of the support member 1 according to the present embodiment.

Figure 2:
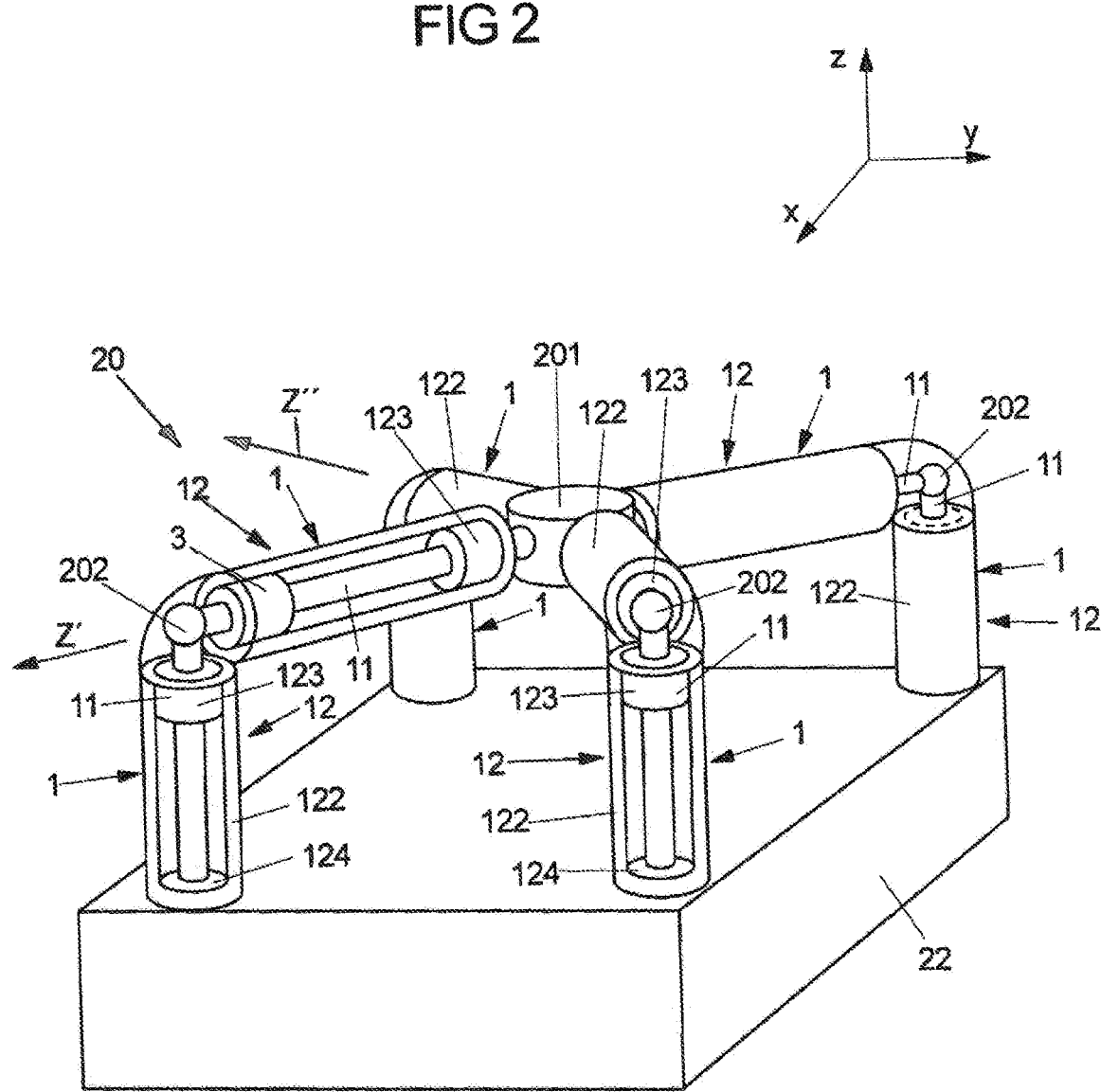
FIG. 2 is an exemplary schematic perspective view showing a portion of a support frame according to one or more embodiments.

FIG. 2 shows schematically and exemplarily an embodiment of a support frame 20 including a plurality of support members 1 of the type described above. A support member 1 according to the embodiment described above with reference to FIGS. 1A-C is disposed on a horizontal surface of a rectangular cuboidal base 22 at each of four corners. Other variants with only three corners are of course also conceivable. All four support members 1 disposed in the corners are aligned in such a way that their respective vertical support element 11 extends substantially along a common vertical main direction of extent Z.

Via respective bottom portions 124, the horizontal support elements 12 of those four support members 1 form a mechanical interface between vertical support elements 11 and base 22, which may be composed of, for example, granite.

Also provided in this exemplary embodiment are four additional support members 1, which perform the function of horizontal cross members. Those additional support members 1 differ from the exemplary embodiment described above with reference to FIG. 1A-C in that each of them has at both ends a bearing element 123 of the type described above, through each of which a respective end of vertical support element 11 extends out of the interior space R of support element 1.

In the framework of the illustrated support frame 20, one end of each of the support elements 11 of the support members 1 acting as cross members is connected to an upper end of a vertical support element 11 of the support members disposed as at 1 in the corners of base 22. The respective other end of the vertical support elements 11 of the support members 1 acting as cross members is connected to a central part 201 of support frame 20. The support elements 11 of the support members 1 acting as cross members extend in space in different vertical main directions of extent Z', Z" within the (global) horizontal plane X-Y.

As was described, in principle, earlier with reference to FIG. 2, the respective vertical support elements 11 of the individual support members 1 are connected to each other (or, in the present case, to external support cylinders 204, which form a mechanical interface to base 22). The structural characteristics of support frame 20 are determined primarily by the vertical support elements of support members 1, additional rigidity being provided by the respective horizontal support elements of support frame 20.

Where the ends of two vertical support elements 11 of different support members 1 are interconnected, this is done by means of a connecting element 202. Connecting elements 202 are preferably configured to block unwanted degrees of freedom of movement and to permit the desired degrees of freedom of movement or to offer only little resistance to the latter, similarly as described above with reference the bearing portions 123 of support members 1.

Figure 3:
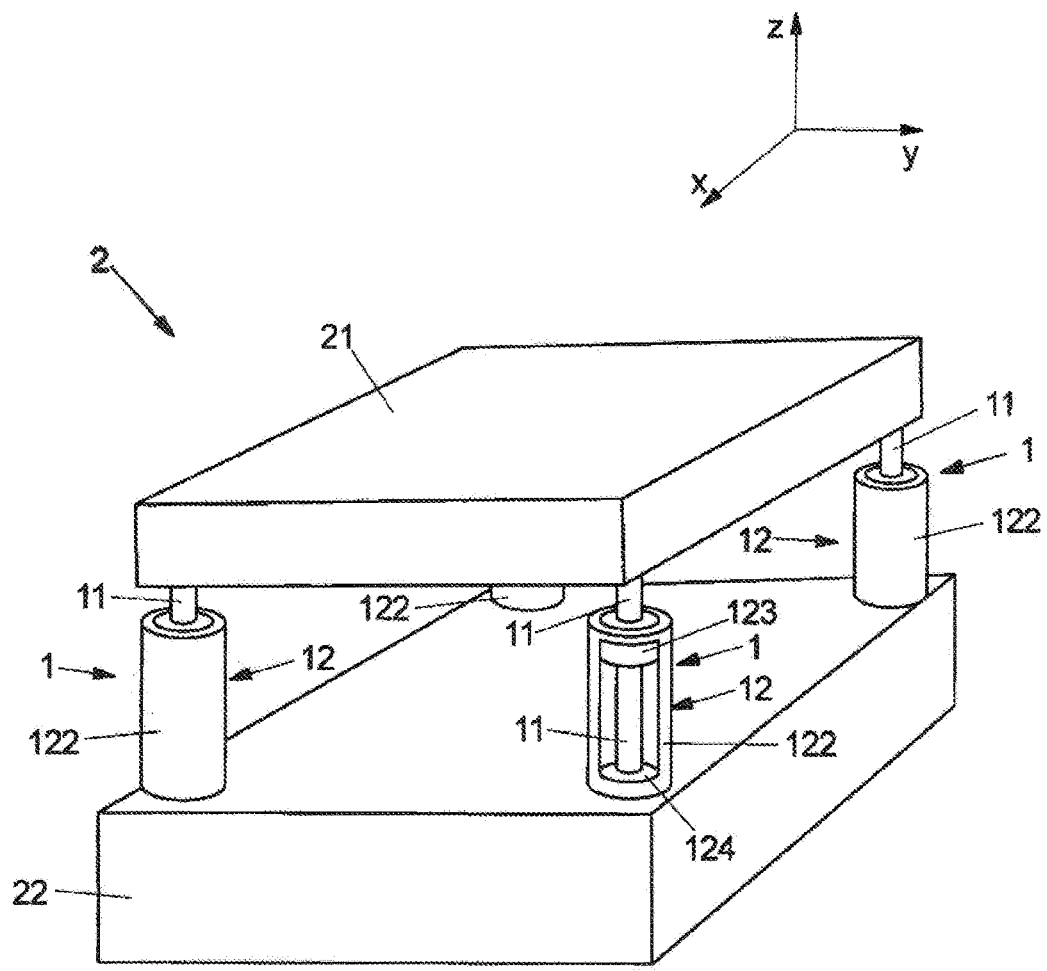
FIG. 3 is an exemplary schematic perspective view showing a portion of a precision device according to one or more embodiments.

FIG. 3 shows schematically and exemplarily a precision device 2 in a suspension for an optical system or a precision work surface, including a plate 21 and a rectangular cuboidal base 22, it being desired for plate 21 to have as small a thermal drift as possible with respect to base 22. Plate 2 and base 22 each have a rectangular cuboidal basic shape, a surface of plate 21 and a surface of base 22 each extending in a horizontal plane X-Y.

A support member 1 of the type described above with reference to FIGS. 1A-C is disposed on the surface of base 22 at each of the four corners. Plate 24 rests on the respective ends of vertical support elements 11, which each extend out of a respective horizontal support element 12 along the common vertical main direction of extent Z.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS 1 support member
11 vertical support element
12 horizontal support element
122 shell portion
123 bearing portion
124 bottom portion
2 precision device
20 support frame
201 central part
202 connecting element
204 support cylinder
21 plate
22 base
R interior space
Z main direction of extent

The invention claimed is:

1. A support member for a precision device, the support member comprising: a vertical support element extending along a vertical main direction of extent, the vertical support element including a material with a low thermal expansion coefficient; and a horizontal support element which horizontally surrounds at least a portion of the vertical support element and which is configured to horizontally support the vertical support element against tilting from the main direction of extent, the horizontal support element bounding a thermally insulating interior space in which the vertical support element is partially accommodated, wherein the interior space is sealed air-tight.

2. The support member as recited in claim 1, wherein a vacuum is present in the interior space.

3. The support member as recited in claim 1, wherein a linear thermal expansion coefficient of the vertical support element is at least a factor of two smaller than a linear thermal expansion coefficient of the horizontal support element.

4. The support member as recited in claim 1, wherein the material with the low thermal expansion coefficient includes an Invar alloy.

5. The support member as recited in claim 1, wherein the horizontal support element includes steel and/or aluminum.

6. The support member as recited in claim 1, wherein the horizontal support element is axially symmetric with respect to the main direction of extent.

7. The support member as recited in claim 1, wherein the horizontal support element is cylindrical in shape or square in a horizontal cross section.

8. The support member as recited in claim 1, wherein the horizontal support element has a bearing portion that horizontally supports the vertical support element.

9. The support member as recited in claim 8, wherein the bearing portion provides an air bearing for the vertical support element.

10. The support member as recited in claim 8, wherein the bearing portion provides a fluid-tight bearing for the vertical support element.

11. The support member as recited in claim 8, wherein a leaf spring is disposed between the vertical support element and the horizontal support element.

12. A support frame for a precision device, the support frame comprising a plurality of interconnected support members configured according to claim 1, the vertical support elements of the plurality of support members having different main directions of extent in space.

13. A precision device in the form of an optical suspension, a metrology frame and/or a precision work surface, the precision device comprising at least one support member according to claim 1.

14. A support member for a precision device, the support member comprising:
a vertical support element extending along a vertical main direction of extent, the vertical support element including a material with a low thermal expansion coefficient; and
a horizontal support element which horizontally surrounds at least a portion of the vertical support element and which is configured to horizontally support the vertical support element against tilting from the main direction of extent, the horizontal support element bounding a thermally insulating interior space in which the vertical support element is partially accommodated, wherein a vacuum is present in the interior space.

* * * * *